United States Patent [19]
Griffith et al.

[11] 3,802,992

[45] Apr. 9, 1974

[54] INHERENT AUTOMATIC REACTOR CONTROL

[75] Inventors: Jerry D. Griffith, Rockville, Md.; Herbert N. Ketola, Pattersonville, N.Y.; Fred M. Finnemore, Marblehead, Mass.

[73] Assignee: The United States of America as represented by the Secretary of the Army, Washington, D.C.

[22] Filed: Oct. 19, 1965

[21] Appl. No.: 498,159

[52] U.S. Cl. .................. 176/20, 176/42, 176/61
[51] Int. Cl. ............................................ G21c 7/26
[58] Field of Search .................. 176/20, 42, 59, 61

[56] References Cited
UNITED STATES PATENTS

| | | | |
|---|---|---|---|
| 3,356,583 | 12/1967 | Deighton | 176/42 |
| 3,150,051 | 9/1964 | Ammon | 176/53 |
| 3,150,052 | 9/1964 | Stoker et al. | 176/52 |
| 3,151,034 | 9/1964 | Douglass, Jr. et al. | 176/65 X |
| 3,247,074 | 4/1966 | Schluderberg et al. | 176/42 |
| 3,284,312 | 11/1966 | West | 176/20 X |
| 3,290,221 | 12/1966 | Gorker | 176/20 X |
| 3,290,222 | 12/1966 | Schoessow et al. | 176/65 X |

*Primary Examiner*—Reuben Epstein
*Attorney, Agent, or Firm*—Joseph A. Hill; William G. Gapcynski; Lawrence A. Neureither

[57] ABSTRACT

This invention relates to an automatic control means for a nuclear reactor, specifically to a means for regulating the energy release rate within the core of a liquid moderated reactor. The regulation is effective under both normal and emergency operating conditions. Of greatest significance to this invention is the density altering means whereby the container is occupied by a material under conditions of supercritical temperature and pressure and the density is altered by altering the temperature or pressure, or both.

9 Claims, 2 Drawing Figures

PATENTED APR 9 1974 3,802,992
Fig.1
Fig.2
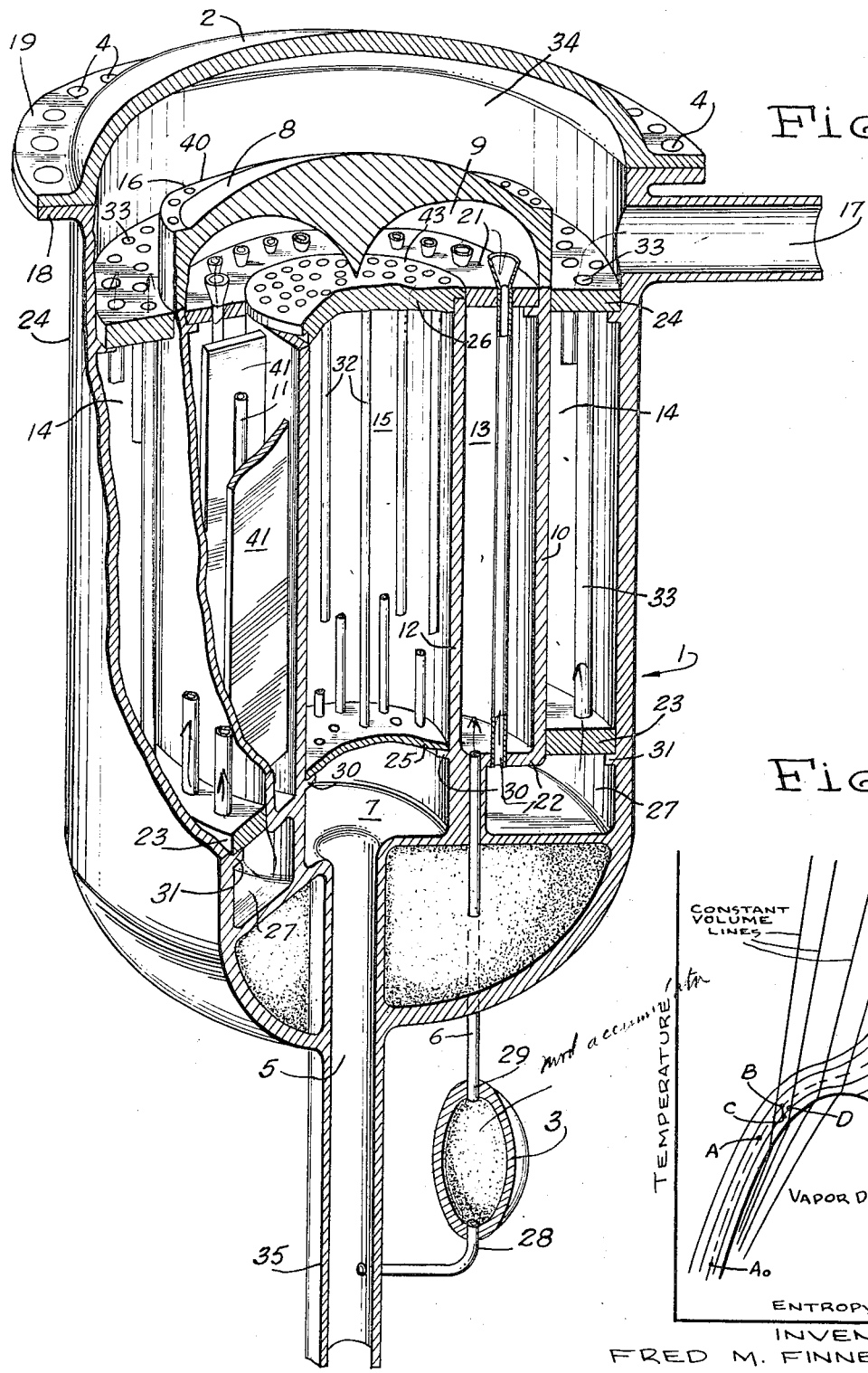
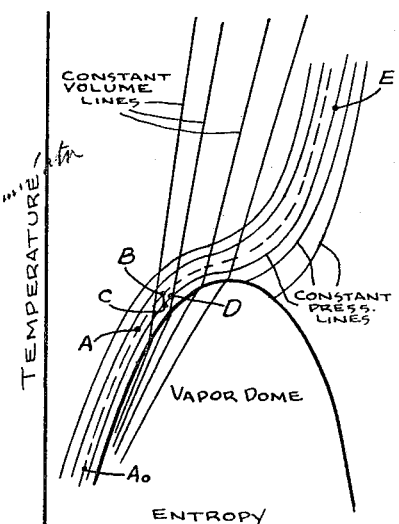
INVENTORS
FRED M. FINNEMORE
JERRY D. GRIFFITH
HERBERT N. KETOLA
BY Joseph A. Hill
ATTORNEY

INHERENT AUTOMATIC REACTOR CONTROL

This invention may be manufactured and used by or for the Government for governmental purposes without the payment to us of any royalty thereon.

BACKGROUND OF THE INVENTION

1. Field of the Invention

It is well known in the nuclear reactor art that the controlling of the power level or rate of energy release of a reactor essentially involves regulating the neutron density within the reactor's fuel bearing core. In order to maintain a chain reaction at a given rate of reactivity, there must be a minimum of one fast neutron per fission. Consequently, when the neutron density is increased above that required to maintain a given rate of reactivity, the rate of reactivity will increase because of the extra neutrons available for reaction. Conversely, when the neutron density decreases the rate of reactivity decreases because there are fewer neutrons available for reaction. The reactivity or rate of energy release is thus a function of the neutron density within the reactor core.

2. Description of the Prior Art

One method of controlling neutron density within the core of a liquid moderated reactor is to surround the core with a blanket of liquid. The moderator liquid governs the neutron density for a given power level by scattering or reflecting a given number of leakage neutrons back into the fuel and absorbing the remaining leakage neutrons. The ability of the moderator liquid to absorb and reflect neutrons, the moderator effectiveness, varies directly with the density of the liquid. An increase in moderator density causes an increased number of neutrons to be reflected into the fuel and consequently causes an increase in reactivity. A decrease in moderator density ultimately causes a decrease in reactivity. Thus, the power level of the reactor is directly controllable by varying the effective density of the moderator liquid.

Effective density is the mass per unit volume of a fixed volume. The density can be altered in several ways. Given a container of fixed dimensions, the effective density of the contents may be altered by allowing the contents to exist in both liquid and gaseous phases and changing the elevation of the free-standing liquid-gas interface. The density may also be altered by completely occupying the container with a liquid and then displacing the liquid by introducing a solid of different specific gravity. Of greatest significance to this invention is the density altering means whereby the container is occupied by a material under conditions of supercritical temperature and pressure and the density is altered by altering the temperature or pressure or both. The density change brought about by this latter means is homogeneous.

SUMMARY OF THE INVENTION

If the pressure of a supercritical moderator liquid such as water is held constant, a large density change can be realized from small changes in temperature. This density change can be seen from the shape of constant pressure lines and distribution of constant specific volume lines above the vapor dome of a temperature-entropy diagram. This relationship of constant pressure and constant specific volume lines is shown in FIG. 2 in the critical pressure and temperature range. The shape of the constant pressure lines are much more horizontal in these temperature and pressure ranges than in the higher and lower temperatures. Constant specific volume lines in this critical area are more widely separated, with a nearly vertical slope, thus indicating large density changes per increment of temperature change at constant pressure.

There are two modes of control necessary during the operation of a reactor, fine control and coarse control. Fine control is used to maintain a prescribed power level under normal conditions. Coarse control is used to rapidly stop reactivity under emergency conditions. This rapid termination of reactivity is referred to as scramming.

Means previously used for fine control in liquid moderated reactors have included (1) varying coolant density, (2) varying moderator liquid level, (3) varying moderator liquid volume by introducing neutron absorbing displacement members, (4) varying the concentration of a neutron absorbing poison injected into the moderator liquid, (5) allowing the moderator liquid to vaporize within certain areas of the reactor, or (6) employing part of the reactor coolant flow as a moderator and allowing this flow to vaporize in certain areas under certain conditions. Scram control has required additional schemes such as mechanically activated neutron absorbing control rods inside the core to obtain rapid reactivity reduction not feasible with fine controls.

These fine and scram control means have been successfully employed in reactors. Serious problems have arisen from the use of these control means, however, particularly in the areas of reliability and maintenance of:

1. Mechanical actuating apparatus for control rods, displacement members and associated equipment which must function under adverse conditions.
2. Complex chemical addition and extraction equipment in the case of poison injection systems.
3. Multiple penetrations of the reactor pressure vessel required for the connection of the control equipment. Accordingly, an object of this invention is to provide an improved and reliable automatic inherent control method for a nuclear reactor.

Another object is to provide an improved fail-safe means for controlling a nuclear reactor incorporating both fine and scram control within the same means.

Another object is to provide a novel inherent method of controlling a nuclear reactor by employing the thermodynamic properties of a water moderator, said control having a negative temperature coefficient.

Another object is to provide a control method for a nuclear reactor which requires no control rods, displacement members, or associated mechanical actuating devices, and a minimum of pressure vessel penetrations.

Another object is to provide an inherent control method which uses the pressure changes resulting from load transients to provide a control having a negative temperature coefficient.

While not limited thereto, this invention will be described as embodied in a supercritical water cooled reactor comprising a pressure vessel, an inner core section, a moderator chamber with heat exchanger tubes, an outer core section, and a scram accumulator.

BRIEF DESCRIPTION OF THE DRAWINGS

FIG. 1 is a perspective view of a reactor with a one quarter vertical section removed to reveal a construction embodying the control means of this invention; and FIG. 2 is a temperature-entropy diagram for water.

DESCRIPTION OF THE PREFERRED EMBODIMENT

As shown in FIG. 1, reactor pressure vessel 1 is preferably cylindrical with an integral closed lower end penetrated at the center by pressure vessel inlet opening 5 which leads upward to inlet plenum chamber 7. Vessel 1 is also penetrated, off center, by moderator charge line 6. The top of vessel 1 is open and has an outwardly projecting radial flange 18 which receives a mating flange 19 of the domed pressure vessel lid 2. Lid 2 is secured by a plurality of bolts 4 which pass through clearance holes suitably located around flange 19 and thread into corresponding holes in flange 18 of pressure vessel 1.

Mounted concentric with pressure vessel 1 is moderator water chamber 13 which comprises a double walled cylinder having inner moderator chamber wall 12, joined integrally at the lower end with outer moderator chamber wall 10 by annular section 22. The upper ends of walls 12 and 10 are closed by an annular shaped section 21. Rings 21 and 22 contain a plurality of holes aligned and sized to receive a series of straight heat exchanger tubes 11 which pass vertically downward through moderator chamber 13 from the top of ring 21 to the bottom of ring 22, thus providing an isolated flow path through said moderator chamber 13. The upper ends of tubes 11 have short flared extensions which act as convergent nozzles.

Moderator chamber 13 is subdivided by a plurality of plates 41 which extend vertically downward from ring 21 through the moderator chamber, parallel to and between heat exchanger tubes 11, terminating at an elevation above the bottom of chamber 13 to allow access to individual compartments from the bottom. Inner moderator chamber wall 12 extends vertically downward beyond ring 22 to serve as the inner wall of lower plenum chamber 27 and the outer wall of inlet plenum chamber 7. This extension of wall 12 is attached to the inside surface of the lower end of pressure vessel 1.

Located external to and below pressure vessel 1 is a spheroidally shaped hollow scram accumulator 3 which has an inlet 28 on the underside communicating directly with coolant supply line 35 and on outlet 29 at the top communicating directly with moderator charge line 6. Access to chamber 13 is obtained through moderator charge line 6 which passes vertically upward from the scram accumulator outlet 29, through the lower end of pressure vessel 1 and ring 22, terminating as an opening in chamber 13 between the lower end of heat exchanger tubes 11 and inner moderator chamber wall 12.

Mounted at the center of the reactor assembly, concentric with inner moderator wall 12 is cylindrically shaped inner core section 15. Core 15 consists of a lower support plate 25 and upper support plate 26 which retain a plurality of parallel tubular enriched fuel elements 32 of either rectangular or circular cross section. Fuel elements 32 are oriented in a particular geometric lattice network consistent with conventional practices within the art. Support plates 25 and 26 contain coolant circulation apertures which allow the entrance and exit of a cooling liquid at the bottom and top of core 15, respectively. The lower end of core 15 is supported by an inwardly projecting radial shoulder 30 located on the inside surface of moderator wall 12. A plurality of capscrews, not shown, pass through a flange 43 of upper support plate 26 and thread into inner moderator wall 12, thus holding inner core 15 in place.

Outer core section 14 has the shape of a hollow double walled cylinder and is mounted concentrically around moderator water chamber 13. A plurality of fuel elements 33 are oriented in a fashion similar to fuel elements 32 between an annular shaped upper support plate 24 and an annular shaped lower support plate 23 both of which contain coolant circulation apertures. Outer core 14 is supported by an inwardly projecting radial shoulder 31 which is located on the inside surface of pressure vessel 1.

Intermediate plenum chamber 9 is hemispherically shaped and located immediately above inner core section 15 and moderator water chamber 13. Chamber 9 is contained by a circular, domed lid 8. Lid 8 is secured by a plurality of bolts 16 which pass through flange 40, and thread into outer moderator wall 10. A conical section projecting downward from the center of the inside concave surface of lid 8 serves as a coolant flowguide within chamber 9.

The reactor outlet plenum chamber 34 occupies the space between lid 2 and lid 8 and is bounded circumferentially by pressure vessel 1. Outlet opening 17 passes radially through the upper portion of pressure vessel 1 and opens into plenum chamber 34 at an elevation slightly above support plate 24 and slightly below flange 18.

A description of the control method of said reactor will be made with reference to FIG. 1 and FIG. 2. Prior to startup, moderator chamber 13 and scram accumulator 3 are filled with a cover gas having a very low moderator effectiveness compared to water, and all reactor coolant passages are filled with liquid coolant.

The first step in starting the reactor is to gradually increase the coolant inlet pressure using a charging pump having flat capacity-head characteristics, or other suitable means. As the pressure rises, the coolant flows up through supply line 35, into pressure vessel 1 and then into chamber 7 where the coolant is distributed to apertures in the lower end of inner core 15. The coolant then passes upward around fuel elements 32, out through apertures in the top of core 15 and into chamber 9. Chamber 9 collects the coolant and directs the flow downward through moderator heat exchanger tubes 11. Lower plenum chamber 27 then receives and reverses the flow upwardly through apertures in the lower end of outer core 14, around fuel elements 33, out through apertures in the top of core 14, and into outlet plenum chamber 34. The coolant then exits the reactor outlet 17.

With the rise in coolant inlet pressure there is an equal pressure rise in accumulator inlet 28 which forces a static head of water upward into scram accumulator 3. Ultimately, the water level rises into moderator chamber 13 to a predetermined level. During this filling process, the cover gas is compressed to a small percentage of its original volume and is contained in the top of moderator chamber 13 above the water. At a point in the filling process where the water level reaches the lower extremities of moderator chamber 13, fast neutrons from the fuel elements are reflected back into the lower portions of core sections 14 and 15 by the low temperature high density moderator water. However, a shutdown margin prevents the core sections from becoming critical until the water level reaches a predetermined higher elevation.

The initial effect of the reactor becoming critical is a rise in the moderator and coolant liquid temperatures. The moderator temperature rise is primarily a result of the slowing down of fast neutrons, gamma radiation heating of the moderator water and chamber walls 10 and 12, and heat transfer from the coolant through chamber walls 10 and 12 and heat exchanger tubes 11. The moderator temperature rise causes a decrease in density and moderator effectiveness which tends to make core sections 14 and 15 become subcritical. In order to compensate for this tendency, the moderator water level is increased by increasing the coolant inlet pressure while simultaneously increasing the coolant flow rate, thus extracting heat from the moderator through heat exchanger tubes 11. At a small percentage of full power the fuel elements reach maximum temperature. Higher power levels are attained by increasing the coolant flow rate which cools the moderator, increases the moderator effectiveness and thus increases the reactivity or rate of energy release within the core sections.

Sustained steady state operation of the reactor is obtained by maintaining a fixed rate of coolant flow and coolant inlet pressure after startup transient conditions have subsided. During steady state operation at a given power level, the coolant temperature rises from $A_0$ to B along the dashed constant pressure line shown in FIG. 2 as the coolant passes through core 15. On entering convergent ends of heat exchanger tubes 11, the coolant undergoes a pressure drop, as indicated by line B–C, which produces a corresponding temperature drop. This temperature drop facilitates the establishment of a log mean temperature difference of sufficient magnitude to allow heat transfer from the moderator to the coolant through heat exchanger tubes 11. Line segment C–D indicates the temperature range of said coolant in passing through said tubes. The coolant then enters core 14 at point D and is heated to point E after which it exits the reactor. During this steady state operation, the moderator is at supercritical conditions in the region above the vapor dome of the temperature-entropy diagram, as indicated by point A in FIG. 2.

The coolant inlet pressure, and thus the moderator water pressure, is held essentially constant with the exception of small operating perturbations. The moderator water temperature is used to sensitively control the moderator effectiveness since the temperature-density relationship in the supercritical region is such that small increments of temperature change produce large increments of density and moderator effectiveness change, effectiveness being directly related to density. Since effectiveness determines the amount of reactivity or rate of energy release within core sections 14 and 15, the moderator water temperature directly affects the power output demanded by external conditions. The reactor control involves the maintenance of a constant inner core outlet temperature, B, for various rates of coolant flow.

If an increase in power output is demanded, as would be manifested by an increase in coolant flow rate and subsequently a decrease in reactor outlet pressure, there occurs the following chain of events in which the increased power demand is automatically met: first, the increased coolant flow initially produces a drop in temperature B which cools the moderator; second, the drop in moderator temperature causes an increase in reactivity due to an increase in moderator effectiveness with density; third, the additional reactivity increases the quantity of heat generated and transferred to the coolant as well as the quantity of heat generated within the moderator water; fourth, this heat generation causes a rise in coolant temperature B; and fifth, the moderator temperature rises, checking the amount of reactivity. This process continues until temperature B regains its original value. Then the moderator temperature remains fixed under a new set of balanced conditions. Conversely, if there is a decrease in power demand, the coolant flow decreases, raising the reactor outlet pressure. Coolant temperature B and then the moderator temperature rise, decreasing reactivity and heat generation. With less heat generation, temperature B drops, regaining its original value and remaining at this level under a new set of balanced conditions. Thus, the control method of this invention automatically supplies steam at essentially constant temperature and pressure to provide the power demanded of the reactor by using the reactor coolant flow rate and outlet pressure to provide a negative temperature coefficient whereby a temperature increase lessens reactivity. This is an important safety factor.

Scram control for rapid shutdown of the reactor under emergency conditions is obtained by rapidly dropping the coolant inlet pressure and scram accumulator inlet pressure. This pressure drop causes the high pressure cover gas to purge the moderator water from the moderator chamber. The gas has a low moderator effectiveness and expands to completely occupy the moderator chamber causing core sections 14 and 15 to immediately become subcritical. Scram accumulator 3 is of sufficient size to contain an expanded volume of cover gas during both high and low temperature conditions. This prevents the loss of gas from the moderator system during the process of scramming and the reentry of water into the moderator chamber as gas contracts after shutdown. Sufficient coolant flow is maintained at shutdown pressure to remove the afterheat from the reactor. Normal shutdown of the reactor is similar to scramming, the difference being a more gradual change in coolant and accumulator inlet pressures.

If a leak occurs at any point in the external coolant lines during normal operation, the reactor automatically scrams since the leak would cause a drop in coolant pressure and flow rate which would cause scramming. Furthermore, if a gas leak occurs in the moderator chamber during shutdown conditions, the reactor will not become critical. Since the moderator chamber is divided into a series of sections, the leakage of cover gas from any one section would not permit enough water to enter the moderator chamber to make the reactor critical. Thus, the reactor configuration and control method are fail-safe under both hot and cold conditions.

We claim:

1. A nuclear reactor having a supercritical fluid moderator comprising a pressure vessel, a core of fuel elements within said pressure vessel, an inlet port and an outlet port in said pressure vessel for entrance and exit of a coolant, said coolant surrounding said fuel elements as it passes through said pressure vessel, a moderator fluid chamber within said pressure vessel and coaxial with said core of fuel elements, a moderator fluid accumulator communicating with said inlet port and said moderator fluid chamber for controlling the elevation of moderator fluid in said chamber, and a plurality of coolant heat exchanger tubes located within said moderator fluid chamber and communicating between said core of fuel elements and said outlet port for changing the temperature of said moderator fluid.

2. A nuclear reactor having a supercritical fluid moderator comprising a pressure vessel, an inner core of fuel elements within said pressure vessel, an outer core of fuel elements within said pressure vessel, an inlet port and an outlet port in said pressure vessel for entrance and exit of a coolant, said coolant surrounding said fuel elements as it passes through said pressure vessel, a moderator fluid chamber within said pressure vessel and positioned between said inner and outer cores of fuel elements, a moderator fluid accumulator communicating with said inlet port and said moderator fluid chamber for controlling the elevation of moderator fluid in said chamber, and a plurality of coolant heat exchanger tubes located within said moderator fluid chamber and communicating between said inner and outer cores of fuel elements for changing the temperature of said moderator fluid.

3. The nuclear reactor described in claim 1 further comprising a moderator fluid contained by said accumulator and moderator fluid chamber, said moderator fluid being water at supercritical temperature and pressure during reactor operation.

4. The nuclear reactor described in claim 2 wherein the entrance ends of said heat exchanger tubes comprise convergent nozzles to cause a coolant pressure and temperature drop at the tube entrances.

5. The nuclear reactor described in claim 4 wherein said moderator fluid chamber further comprises a plurality of radial plates attached to the walls of the moderator chamber to divide the chamber into a plurality of subcompartments, each compartment housing a heat exchanger tube.

6. The nuclear reactor described in claim 5 wherein said radial plates dividing said moderator fluid chamber are suspended above the chamber floor to provide a clear passageway around said chamber at its bottom.

7. A nuclear reactor having a supercritical fluid moderator comprising a pressure vessel, an inlet port and an outlet port in said vessel for entrance and exit of a coolant, said inlet port communicating with the reactor fuel elements, an inner core of fuel elements within said vessel, said core being defined by a cylindrical side wall and an upper and lower end plate, said upper and lower end plates having apertures for entrance and exit of a coolant to surround said fuel elements, an outer core of fuel elements within said vessel, said core being defined by cylindrical side walls and an upper and lower annular end plate, said upper and lower end plates supporting said fuel elements and having apertures for entrance and exit of a coolant to surround said fuel elements, a moderator fluid chamber between said inner and outer cores of fuel elements, said chamber being defined by the outer wall of the inner core and the inner wall of the outer core, by upper and lower annular end plates, and by a plurality of radial plates extending between the inner and outer chamber walls, a plurality of heat exchanger tubes within the subdivisions of said moderator fluid chamber created by said radial plates, said tubes extending through the chamber's upper and lower end plate to communicate coolant from the upper end of said inner core of fuel elements to the lower end of said outer core of fuel elements for changing the temperature of said moderator fluid, said tubes having convergent upper ends to cause a pressure and temperature drop in said coolant as it enters said tubes, a moderator fluid accumulator communicating with said inlet port and said moderator fluid chamber for controlling the elevation of moderator fluid in said chamber, said coolant entering said pressure vessel at the inlet port, passing upwardly around the fuel elements of said inner core, passing downwardly through said heat exchanger tubes where it affects the temperature of said moderator and then upwardly around the fuel elements of said outer core to said outlet port.

8. A method for controlling the reactivity of a nuclear reactor having a supercritical fluid moderator, an inner and outer core of fuel elements and a moderator fluid chamber between said cores, said method comprising the steps of introducing a coolant into the pressure vessel of the nuclear reactor at substantially constant operating pressure, passing the coolant upwardly around the fuel elements of said inner core, exiting the coolant from said inner core at constant operating temperature, passing the coolant through a convergent nozzle into a heat exchanger tube located within said moderator fluid chamber to control the temperature of the moderator fluid within said chamber, passing the coolant upwardly around the fuel elements of said outer core to an outlet port in the reactor pressure vessel, the rate of coolant flow varying with power demand to affect moderator fluid temperature and consequently density and reactivity.

9. The method described in claim 8 wherein said moderator fluid is water at supercritical temperature and pressure during reactor operation.

* * * * *